(12) United States Patent
Kawatani (10) Patent No.: US 10,986,190 B2
(45) Date of Patent: Apr. 20, 2021

(54) INFORMATION PROCESSING DEVICE AND METHOD FOR UPDATING A SESSION TIMER

(71) Applicant: NIPPON TELEGRAPH AND TELEPHONE CORPORATION, Tokyo (JP)

(72) Inventor: Muneyuki Kawatani, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/977,105

(22) PCT Filed: Mar. 25, 2019

(86) PCT No.: PCT/JP2019/012516
§ 371 (c)(1),
(2) Date: Sep. 1, 2020

(87) PCT Pub. No.: WO2019/188986
PCT Pub. Date: Oct. 3, 2019

(65) Prior Publication Data
US 2020/0412814 A1    Dec. 31, 2020

(30) Foreign Application Priority Data

Mar. 29, 2018 (JP) .............................. JP2018-064140

(51) Int. Cl.
*H04L 29/08* (2006.01)
(52) U.S. Cl.
CPC .................. *H04L 67/145* (2013.01)

(58) Field of Classification Search
None
See application file for complete search history.

(56) References Cited

U.S. PATENT DOCUMENTS

| 8,701,179 B1 * | 4/2014 | Penno | H04L 61/203 |
| | | | 726/13 |
| 2003/0061426 A1 * | 3/2003 | Connor | H04L 47/10 |
| | | | 710/265 |

(Continued)

FOREIGN PATENT DOCUMENTS

| JP | 2006-343307 A | 12/2006 |
| JP | 2009-237987 A | 10/2009 |
| JP | 2015-89046 A | 7/2015 |

OTHER PUBLICATIONS

"How to implement Session timeout in Web Server Side?" Apr. 4, 2010, https://stackoverflow.com/questions/2574929/how-to-implement-session-timeout-in-web-server-side, 2 pp.

*Primary Examiner* — Joshua Joo
(74) *Attorney, Agent, or Firm* — Xsensus LLP (57) ABSTRACT

An information processing device (20) performs a session timer updating process of restoring the remaining time of a session timer to N seconds whenever a packet is received from a client (10). The information processing device (20) does not perform the session timer updating process even when a packet is received from the client (10) until a session timer update stop time (Δ) elapses after the session timer was last updated. The information processing device (20) resumes the session timer updating process after the session timer update stop time (Δ) has elapsed after the session timer was last updated.

18 Claims, 6 Drawing Sheets

(56) References Cited

U.S. PATENT DOCUMENTS

| | | | | |
|---|---|---|---|---|
| 2003/0138827 | A1* | 7/2003 | Kononen | G02B 21/34 |
| | | | | 435/6.14 |
| 2003/0202480 | A1* | 10/2003 | Swami | H04L 47/193 |
| | | | | 370/252 |
| 2006/0123119 | A1* | 6/2006 | Hill | H04L 67/145 |
| | | | | 709/227 |
| 2007/0162813 | A1* | 7/2007 | Nakashima | H04L 1/1607 |
| | | | | 714/749 |
| 2012/0044879 | A1* | 2/2012 | Park | H04W 74/08 |
| | | | | 370/329 |
| 2013/0217403 | A1* | 8/2013 | Yamamoto | H04W 72/04 |
| | | | | 455/450 |
| 2014/0006612 | A1* | 1/2014 | Fallon | H04L 41/5032 |
| | | | | 709/224 |
| 2014/0101338 | A1* | 4/2014 | Diamant | G06F 3/0661 |
| | | | | 710/5 |
| 2015/0120863 | A1* | 4/2015 | Wu | H04L 67/28 |
| | | | | 709/217 |
| 2019/0245767 | A1* | 8/2019 | Di Girolamo | H04L 67/145 |
| 2020/0068017 | A1* | 2/2020 | Dhamdhere | H04L 69/18 |

* cited by examiner

INFORMATION PROCESSING DEVICE AND METHOD FOR UPDATING A SESSION TIMER

CROSS-REFERENCE TO RELATED APPLICATIONS

The present application is based on PCT filing PCT/JP2019/012516, filed Mar. 25, 2019, which claims priority to JP 2018-064140, filed Mar. 29, 2018, the entire contents of each are incorporated herein by reference.

TECHNICAL FIELD

The present invention relates to an information processing device, an information processing method, and an information processing program.

BACKGROUND ART

Many servers and stateful network devices (hereinafter collectively referred to as "network devices") have a session table for managing connections such as TCP (Transmission Control Protocol).

A network device having the session table holds session information of communication with a communication counterpart device (for example, a client) in the session table until a time set in a session timer elapses in preparation for unexpected communication disconnection (for example, no FIN is returned) from the communication counterpart device. After the time set in the session timer elapses, the network device deletes the session information of the communication from the session table.

Here, the network device resets (extends) a session timer whenever a packet is received from the communication counterpart device in preparation for prolonged communication with the communication counterpart device. In this way, the network device can continue communication with the communication counterpart device even when the communication time with the communication counterpart device exceeds the time set in the session timer.

This will be described with reference to FIG. 5. In this example, a case in which a network device including a session table is a server and a communication counterpart device of the network device is a client will be described.

Figure 5:
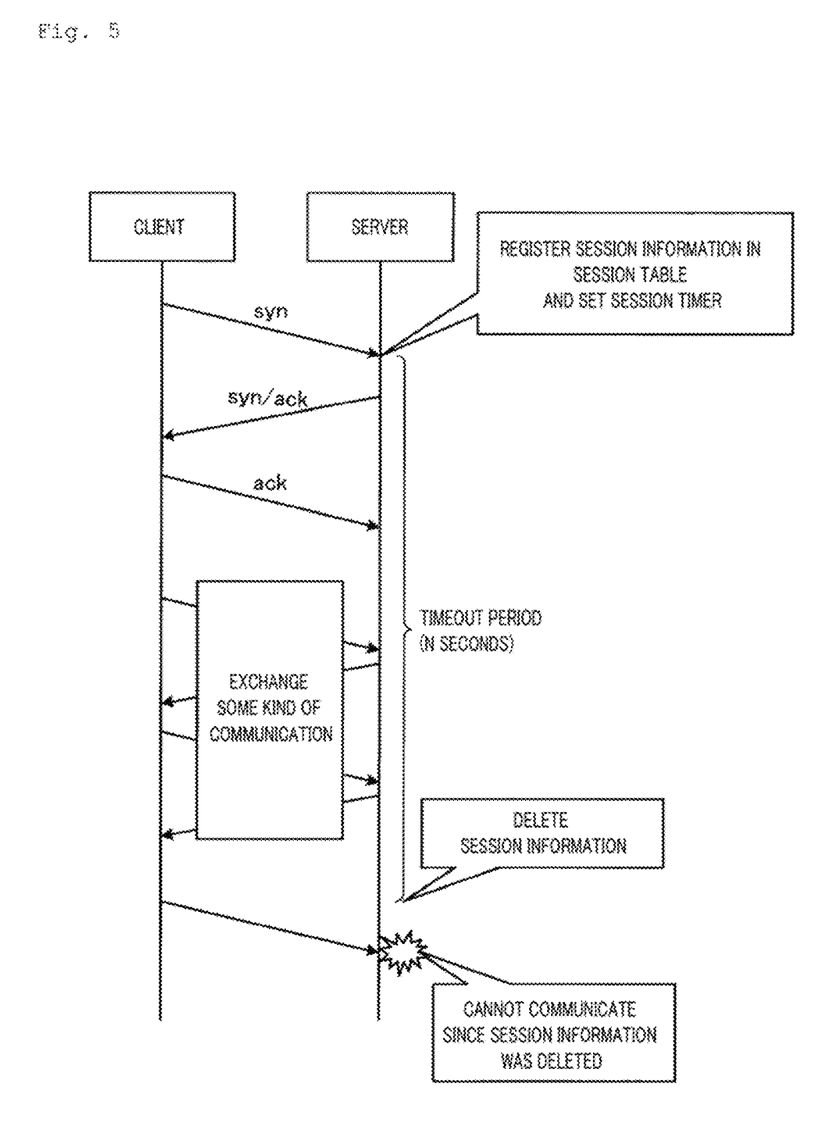
FIG. 5 is a diagram for describing updating of a session table according to a conventional technique.

For example, as illustrated in FIG. 5, when a server receives a syn packet of TCP from a client and starts communication, the server registers session information in a session table and sets a session timer. For example, a prescribed timeout period (for example, N seconds) is set in the session timer. After that, the server exchanges some kind of communication with the client and deletes the session information of the communication from the session table when a remaining time indicated by the session timer reaches zero. Here, when the server was still communicating with the client, since the session information was deleted from the session table, the server cannot communicate with the client.

Figure 6:
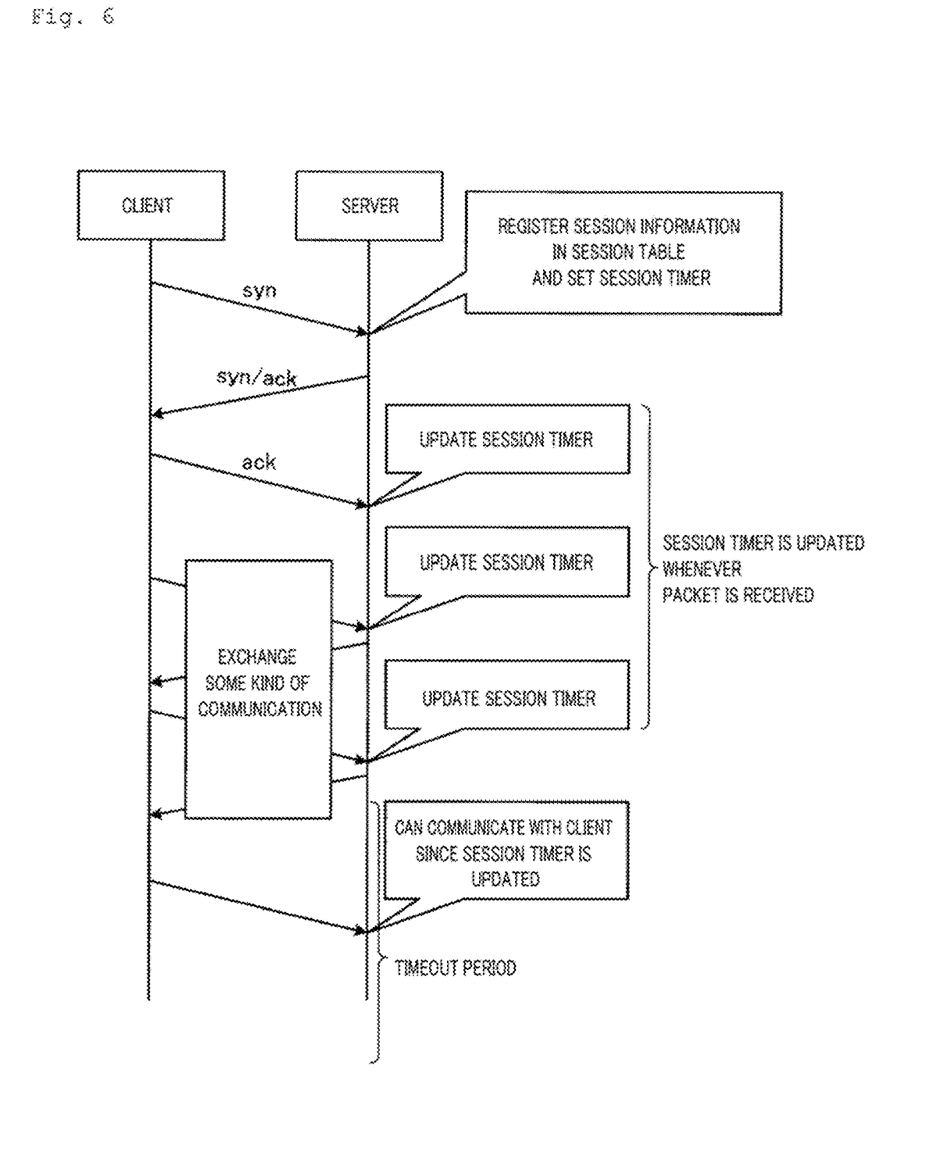
FIG. 6 is a diagram for describing updating of a session table according to a conventional technique.

Therefore, as illustrated in FIG. 6, after the server starts communication with the client, registers session information in a session table, and sets a session timer, when a packet is received from the client, the server updates the session timer. For example, the server restores a remaining time indicated by the session timer to a prescribed time (for example, N seconds) whenever a packet is received from the client. With this process, even when communication between the server and the client is prolonged, since the session timer is updated (extended), the server can communicate with the client.

CITATION LIST

Non Patent Literature

[NPL 1] How to implement Session timeout period in Web Server Side?, [retrieved on Mar. 15, 2018], Internet <URL:https://stackoverflow.com/questions/2574929/how-to-implement-session-timeout-in-web-server-side>

SUMMARY OF THE INVENTION

Technical Problem

However, when packets arrive at the network device several times within the time set in the session timer, the load of the session timer updating process in the network device increases. Therefore, an object of the present invention is to solve the above-described problems and alleviate the load of a session timer updating process in a network device.

Means for Solving the Problem

In order to solve the problems, the present invention provides an information processing device including a session table indicating session information related to communication with other device, including: a communication processing unit that performs communication with other device; a timer setting unit that sets a timeout period which is a remaining time until session information related to communication with the other device is deleted to a session timer in the session table; a timer updating unit that performs a timer updating process of restoring the remaining time of the session timer to a prescribed timeout period whenever a packet is received from the other device after communication with the other device was started; a timer update control unit that stops the timer updating process of the timer updating unit for a prescribed period after the timer updating process was last performed and resumes the timer updating process of the timer updating unit after the prescribed period elapses; and a deleting unit that deletes session information related to the communication with the other device in the session table when it is determined that the timeout period has elapsed by referring to the session timer.

Effects of the Invention

According to the present invention, it is possible to alleviate the load of a session timer updating process in a network device.

DESCRIPTION OF EMBODIMENTS

Hereinafter, a mode (an embodiment) for carrying out of the present invention will be described with reference to the drawings. The present invention is not limited to this embodiment.

[Overview]

Figure 1:
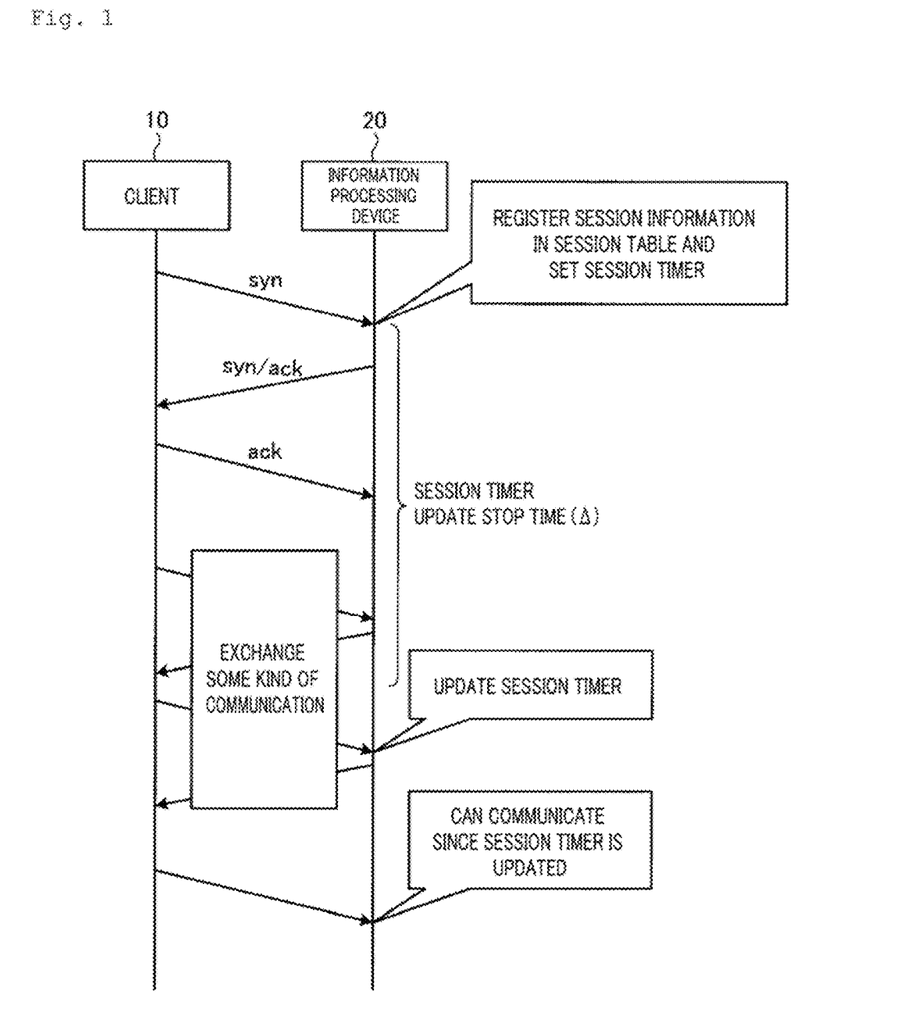
FIG. 1 is a diagram illustrating an overview of an operation of an information processing device.

First, an overview of an operation of an information processing device according to the present embodiment will be described with reference to FIG. 1. In the following description, a case in which an information processing device (a network device) 20 communicates with a client 10 according to a TCP session will be described.

When the information processing device 20 starts communication with the client 10 and receives a syn packet from the client 10, the information processing device 20 registers session information related to the communication in a session table. The information processing device 20 sets a timeout period (for example, N seconds) of the session information to a session timer in the session table. After that, the information processing device 20 exchanges some kind of communication with the client 10 such as transmission of syn or ack packets to the client 10 and reception of ack packets from the client 10.

Here, the information processing device of the conventional technique performs a process (a session timer updating process) of restoring a remaining time indicated by a session timer to N seconds whenever a packet is received from the client 10. However, the information processing device 20 of the present embodiment stops the updating of the session timer until a session timer update stop time ($\Delta$) elapses after the session timer was last updated.

That is, the information processing device 20 does not update the session timer even when a packet is received from the client 10 until the session timer update stop time ($\Delta$) elapses after the session timer was last updated. After the session timer update stop time elapses, the information processing device 20 resumes the session timer updating process (a timer updating process). That is, the information processing device 20 updates the session timer upon receiving a packet from the client 10. After that, the information processing device 20 does not update the session timer even when a packet is received from the client 10 until the session timer update stop time ($\Delta$) elapses again. The information processing device 20 repeats such a process while a communication session with the client 10 continues.

That is, the information processing device 20 inserts the session timer update stop time ($\Delta$) during updating of the session timer during communication with the client 10. In this way, since the information processing device 20 does not need to update the session timer whenever a packet is received from the client 10 even when communication with the client 10 is prolonged, it is possible to alleviate the load of the session timer updating process.

Figure 2:
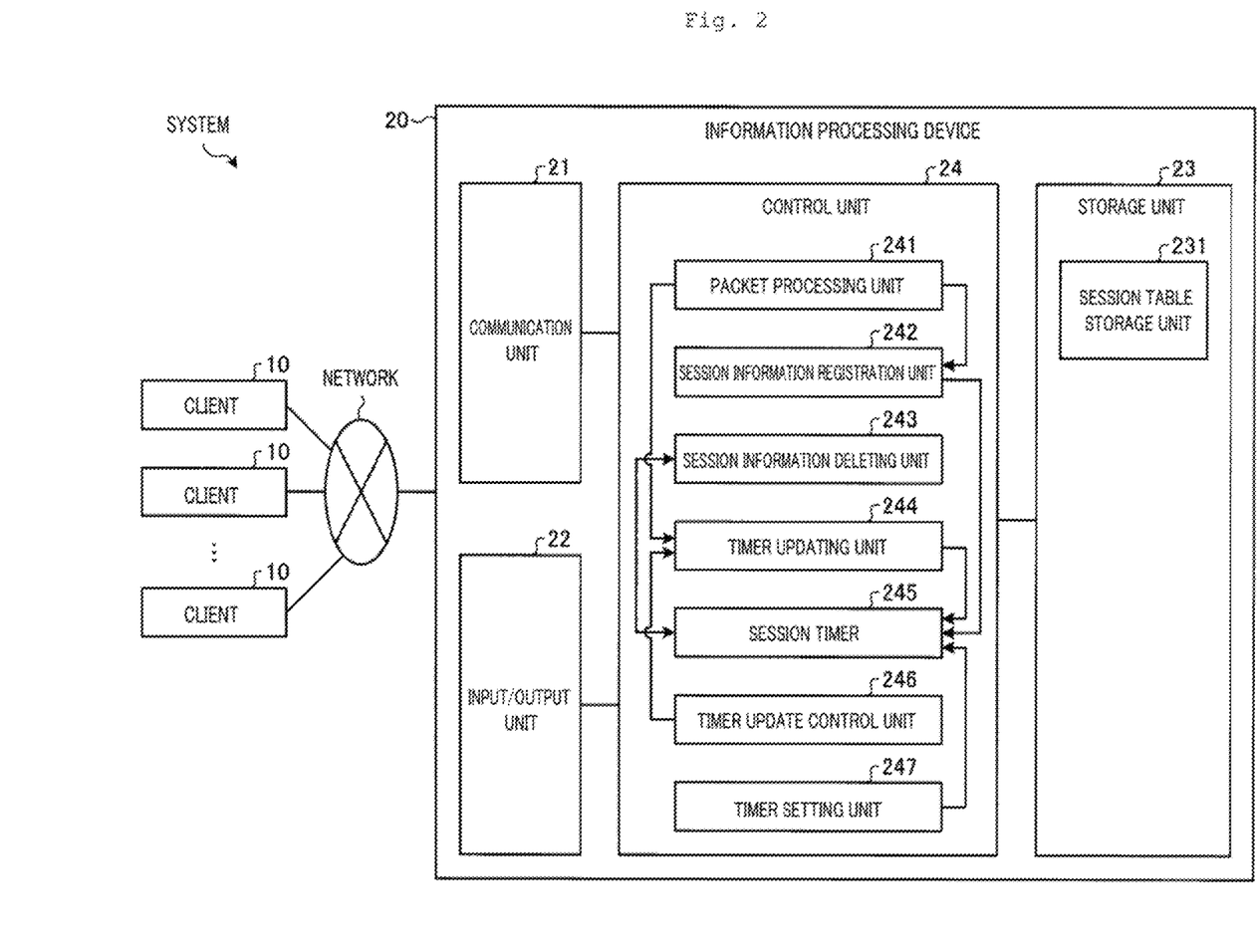
FIG. 2 is a diagram illustrating a configuration example of a system.

[Configuration] Next, a configuration example of a system including the information processing device 20 will be described with reference to FIG. 2. The system includes one or more clients 10 and the information processing device 20, for example. The client 10 and the information processing device 20 are connected by a network such as the Internet, for example. The client 10 is a personal computer that can communicate via a network, for example, and the information processing device 20 is a server that can communicate via a network, for example.

The information processing device 20 includes a communication unit 21, an input/output unit 22, a storage unit 23, and a control unit 24. The communication unit 21 serves as an interface when performing communication with another device via a network. For example, the communication unit 21 receives packets from the client 10 and transmits packets to the client 10 via a network.

The input/output unit 22 serves as an interface for inputting and outputting data. The input/output unit 22 receives input of a timeout period of session information set to the session timer 245, a session timer update stop time, and the like from an administrator of the information processing device 20, for example. When it is necessary to hold the session information in the session table for T seconds, and the session timer update stop time is to be set to $\Delta$ seconds, the timeout period (N seconds) set in the session timer 245 is (T+$\Delta$) seconds.

The storage unit 23 stores various pieces of information referred to when the control unit 24 performs processes. For example, the storage unit 23 stores the timeout period, the session timer update stop time ($\Delta$), and the like input via the input/output unit 22. Moreover, the storage unit 23 includes a session table storage unit 231 in a prescribed area. The session table storage unit 231 stores a session table.

The session table is a table illustrating session information of communication with another device (for example, the client 10). The session information registered in the session table is illustrated in Table 1.

As illustrated in Table 1, for example, the session information includes session identification information (for example, "#1") of a received packet, a transmitter IP (Internet Protocol) address (for example, "IP-C-1") of the received packet, a transmitter port number (for example, "xxxx"), a protocol number (for example, "6 (tcp)", and a transmitter MAC (Media Access Control) address (for example, "MCLB-1"). In the session information illustrated in Table 1, the transmitter MAC address is recorded as a return MAC address. Moreover, the session information is used when resuming communication such as when a packet processing unit 241 (to be described later) transmits a downlink packet with respect to an uplink packet and when unexpected communication disconnection occurs between the information processing device and a communication counterpart device (for example, a client). The session information in the session table is registered by a session information registration unit 242 (to be described later) and is deleted by a session information deleting unit 243 (to be described later).

TABLE 1

SESSION TABLE

| # | TRANS-MITTER IP ADDRESS | TRANS-MITTER PORT NUMBER | PROTOCOL NUMBER | RETURN MAC ADDRESS |
|---|---|---|---|---|
| 1 | IP-C-1 | xxxx | 6 (tcp) | MC-LB-1 |
| ... | | | | |

The control unit 24 includes a packet processing unit 241, a session information registration unit (a registration unit) 242, a session information deleting unit (a deleting unit) 243, a timer updating unit 244, a session timer 245, a timer update control unit 246, and a timer setting unit 247.

The packet processing unit 241 receives packets from the client 10 and transmits packets to the client 10 via the communication unit 21.

When the information processing device 20 starts communication with the client 10, the session information registration unit 242 registers session information of the communication in the session table.

The session information deleting unit 243 deletes session information from the session table. For example, when it is determined that a timeout period of session information has arrived by referring to the remaining time indicated by the session timer 245, the session information deleting unit 243 deletes the session information from the session table. That is, when the remaining time indicated by the session timer 245 reaches zero, the session information deleting unit 243 deletes session information from the session table.

After communication with other device (for example, the client 10) starts, when a packet is received from the device, the timer updating unit 244 performs a timer updating process of restoring the remaining time of the session timer 245 to a prescribed timeout period (for example, N seconds) only when the timer updating unit 244 is not stopped by the timer update control unit 246.

The session timer 245 is a timer indicating the remaining time until the session information is deleted from the session table.

The timer update control unit 246 stops (suppresses) the timer updating process of the timer updating unit 244 until the session timer update stop time (Δ) elapses after the timer updating process was last performed. The timer update control unit 246 resumes the timer updating process of the timer updating unit 244 after the session timer update stop time elapses. The session timer update stop time (Δ) is shorter than the timeout period (for example, N seconds) of the session information.

The timer setting unit 247 sets the timeout period input via the input/output unit 22 in the session timer 245.

According to the information processing device 20 described above, since it is not necessary to update the session timer 245 whenever a packet is received from the client 10 even when communication with the client 10 is prolonged, it is possible to alleviate the processing load of updating the session timer 245.

Figure 3:
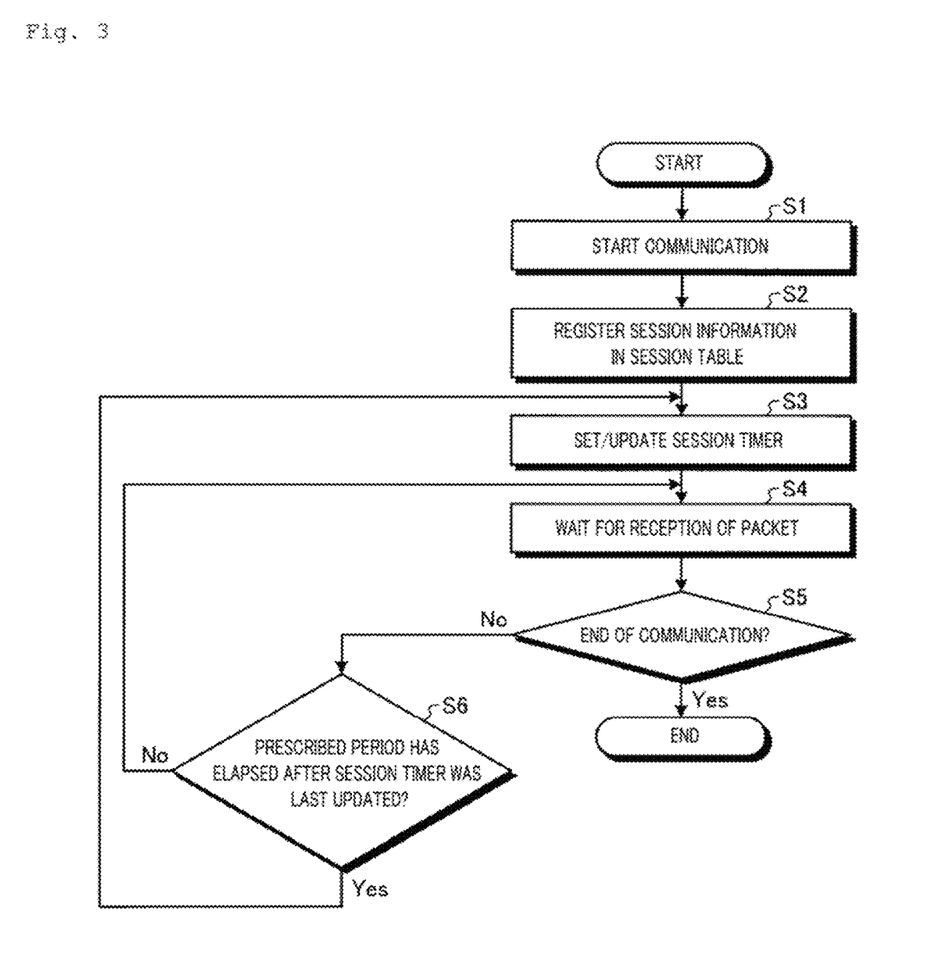
FIG. 3 is a flowchart illustrating an example of processing procedures of setting and updating a session timer by the information processing device.

[Processing procedure] Next, an example of processing procedures of setting and updating a session timer by the information processing device 20 will be described with reference to FIG. 3. It is assumed that the timeout period (N seconds) set to the session timer 245 and the session timer update stop time (Δ seconds) have been input to the information processing device 20.

When the packet processing unit 241 of the information processing device 20 starts communication with the client 10 (S1), the session information registration unit 242 registers session information of the communication in the session table (S2: register session information in session table). Moreover, the control unit 24 sets or updates the session timer 245 (S3). For example, the timer setting unit 247 sets a prescribed timeout period (N seconds) to the session timer 245. Alternatively, the timer updating unit 244 updates the remaining time of the session timer 245 to the prescribed timeout period (N seconds).

Subsequently to S3, the control unit 24 waits for reception of a packet from the client 10 (S4) and ends a communication process if the received packet indicates the end of communication (S5: Yes). For example, the control unit 24 ends the communication process when the packet received from the client 10 is FIN or RST. On the other hand, when the received packet does not indicate the end of communication (for example, FIN or RST) (S5: No), the timer update control unit 246 determines whether a prescribed period (the session timer update stop time (Δ seconds)) has elapsed after the session timer 245 was last updated (or the timeout period (N seconds) was first set to the session timer 245) (S6). Here, the flow returns to S4 when the prescribed period has not elapsed (S6: No) after the session timer 245 was last updated (or the timeout period (N seconds) was first set to the session timer 245).

On the other hand, the flow returns to S3 when the prescribed period (the session timer update stop time (Δ seconds)) has elapsed (S6: Yes) after the session timer 245 was last updated (or the timeout period (N seconds) was first set to the session timer 245). That is, the timer updating unit 244 updates the remaining time of the session timer 245 to the prescribed timeout period (N seconds).

According to the information processing device 20 described above, since it is not necessary to update the session timer 245 whenever a packet is received from the client 10 even when communication with the client 10 is prolonged, it is possible to alleviate the processing load of updating the session timer 245.

Although a case in which the information processing device 20 is a device that performs communication with the client 10 according to a TCP session has been described, there is no limitation thereto. For example, the information processing device 20 may be a device that performs communication with the client 10 according to a NAT (Network Address Translation) session or an HTTP (Hypertext Transfer Protocol) session.

[Program]

The present invention can be implemented by installing a program that realizes the functions of the information processing device 20 described in the embodiment in an information processing device (a computer). For example, by causing an information processing device to execute the program provided as package software or online software, the information processing device can function as the information processing device 20. The information processing device mentioned herein includes a desktop or laptop-type personal computer, a rack-mounted server computer, and the like. In addition, mobile communication terminals such as a smartphone, a cellular phone, or a PHS (Personal Handyphone System), and a PDA (Personal Digital Assistant) are included in the category of the information processing device. Furthermore, the information processing device 20 may be implemented in a cloud server.

Figure 4:
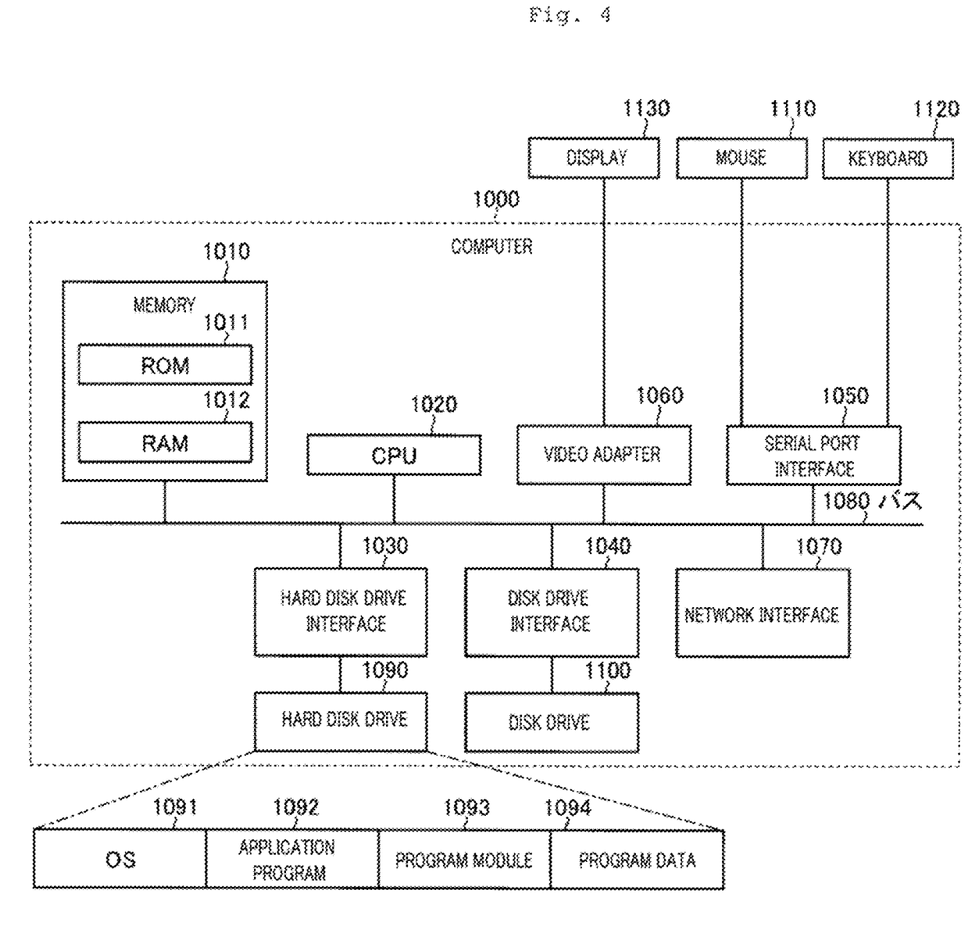
FIG. 4 is a diagram illustrating a computer executing an information processing program.

An example of a computer that executes the program (an information processing program) will be described with reference to FIG. 4. As illustrated in FIG. 4, a computer 1000 includes, for example, a memory 1010, a CPU 1020, a hard disk drive interface 1030, a disk drive interface 1040, a serial port interface 1050, a video adapter 1060, and a network interface 1070. These elements are connected by a bus 1080.

The memory 1010 includes a ROM (Read Only Memory) 1011 and a RAM (Random Access Memory) 1012. The ROM 1011 stores a boot program such as a BIOS (Basic Input Output System), for example. The hard disk drive interface 1030 is connected to a hard disk drive 1090. The disk drive interface 1040 is connected to a disk drive 1100. A removable storage medium such as a magnetic disk or an optical disc is inserted into the disk drive 1100. A mouse 1110 and a keyboard 1120, for example, are connected to the serial port interface 1050. For example, a display 1130 is connected to the video adapter 1060.

Here, as illustrated in FIG. 4, the hard disk drive 1090 stores an OS 1091, an application program 1092, a program module 1093, and program data 1094, for example. Various types of data and information described in the embodiment are stored in the hard disk drive 1090 and the memory 1010, for example.

The CPU 1020 reads the program module 1093 and the program data 1094 stored in the hard disk drive 1090 into the RAM 1012 as necessary and performs the above-described procedures.

The program module 1093 and the program data 1094 related to the information processing program are not limited to being stored in the hard disk drive 1090, and for example, may be stored in a removable storage medium and read by the CPU 1020 via the disk drive 1100 and the like. Alternatively, the program module 1093 and the program data 1094 related to the program may be stored in other computers connected via a network such as a LAN or a WAN (Wide Area Network) and read by the CPU 1020 via the network interface 1070. Moreover, the computer 1000 may execute processes using a GPU (Graphics Processing Unit) instead of the CPU 1020.

REFERENCE SIGNS LIST

10 Client
20 Information processing device
21 Communication unit
22 Input/output unit
23 Storage unit
24 Control unit
241 Packet processing unit
242 Session information registration unit
243 Session information deleting unit
244 Timer updating unit
245 Session timer
246 Timer update control unit
247 Timer setting unit

The invention claimed is:

1. An information processing device including a session table indicating session information related to communication with another device, the information processing device comprising:
    a memory; and
    a processing circuit configured to:
        control communication with the other device;
        set a timeout period, which is a remaining time until session information related to communication with the other device is deleted, to a session timer in the session table;
        perform a timer updating process of restoring the remaining time of the session timer to a prescribed timeout period whenever a packet is received from the other device after communication with the other device was started;
        stop the timer updating process for a prescribed period after the timer updating process was last performed and resumes the timer updating process after the prescribed period elapses; and
        delete session information related to the communication with the other device in the session table in response to a determination that the timeout period has elapsed by referring to the session timer.

2. The information processing device according to claim 1, wherein the processing circuit is configured to determine whether the timeout period has elapsed by referring to the session timer.

3. The information processing device according to claim 2, wherein in a case that the processing circuit determines that the timeout period has not elapsed, the processing circuit is further configured to wait for reception of a next packet from the other device.

4. The information processing device according to claim 1, wherein the timeout period, set by the processing circuit, is stored in the memory.

5. The information processing device according to claim 1, wherein the memory stores the session table.

6. The information processing device according to claim 1, wherein the processing circuit is further configured to register the session information in the session table after communication with the other device was started and before setting the timeout period.

7. An information processing method executed by an information processing device including a session table indicating session information related to communication with another device, the information processing method comprising:
    communicating with the other device;
    setting a timeout period, which is a remaining time until session information related to communication with the other device is deleted, to a session timer in the session table;
    performing a timer updating process of restoring a timeout period of the session timer to a prescribed timeout period whenever a packet is received from the other device after communication with the other device was started;
    stopping the timer updating process for a prescribed period after the timer updating process was last performed and resuming the timer updating process after the prescribed period elapses; and
    deleting session information related to the communication with the other device in the session table in response to a determination that the timeout period has elapsed by referring to the session timer.

8. The information processing method according to claim 7, further comprising determining whether the timeout period has elapsed by referring to the session timer.

9. The information processing method according to claim 8, further comprising waiting, in a case that the determining indicates that the timeout period has not elapsed, for reception of a next packet from the other device.

10. The information processing method according to claim 7, further comprising storing the timeout period in a memory.

11. The information processing method according to claim 7, further comprising storing the session table in a memory.

12. The information processing method according to claim 7, further comprising registering the session information in the session table after communication with the other device was started and before setting the timeout period.

13. A non-transitory computer readable storage medium storing an information processing program which, when executed by a computer including a session table indicating session information related to communication with another device, causes the computer to:
    communicate with another the other device;
    set a timeout period, which is a remaining time until session information related to communication with the other device is deleted, to a session timer in the session table;
    perform a timer updating process of restoring a timeout period of the session timer to a prescribed timeout period whenever a packet is received from the other device after communication with the other device was started;

stop the timer updating process for a prescribed period after the timer updating process was last performed and resuming the timer updating process after the prescribed period elapses; and delete session information related to the communication with the other device in the session table in response to a determination that the timeout period has elapsed by referring to the session timer.

14. The non-transitory computer readable storage medium according to claim 13, wherein the computer is further caused to determine whether the timeout period has elapsed by referring to the session timer.

15. The non-transitory computer readable storage medium according to claim 14, wherein the computer is further caused to, in a case that the computer determines that the timeout period has not elapsed, wait for reception of a next packet from the other device.

16. The non-transitory computer readable storage medium according to claim 13, wherein the computer is further caused to store the timeout period in a memory.

17. The non-transitory computer readable storage medium according to claim 13, wherein the computer is further caused to store the session table in a memory.

18. The non-transitory computer readable storage medium according to claim 13, wherein the computer is further caused to register the session information in the session table after communication with the other device was started and before setting the timeout period.

* * * * *